United States Patent
Tsigutkin

(10) Patent No.: US 8,767,291 B2
(45) Date of Patent: Jul. 1, 2014

(54) SUPPRESSION OF PARASITIC OPTICAL FEEDBACK IN PULSE LASER SYSTEMS

(71) Applicant: KLA-Tencor Corporation, Milpitas, CA (US)

(72) Inventor: Konstantin Tsigutkin, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 13/789,870

(22) Filed: Mar. 8, 2013

(65) Prior Publication Data

US 2013/0242380 A1     Sep. 19, 2013

Related U.S. Application Data

(60) Provisional application No. 61/611,701, filed on Mar. 16, 2012.

(51) Int. Cl.
| | |
|---|---|
| *H01S 3/106* | (2006.01) |
| *H01S 3/08* | (2006.01) |
| *H01S 3/23* | (2006.01) |
| *H01S 3/117* | (2006.01) |
| *H01S 3/00* | (2006.01) |
| *H01S 3/10* | (2006.01) |

(52) U.S. Cl.
CPC ............... *H01S 3/1003* (2013.01); *H01S 3/005* (2013.01); *H01S 3/117* (2013.01); *H01S 3/10015* (2013.01); *H01S 2301/02* (2013.01)
USPC .......................................................... 359/346

(58) Field of Classification Search
CPC . H01S 3/0085; H01S 3/0057; H01S 3/10038; H01S 3/10046; H01S 3/10084; H01S 3/10092
See application file for complete search history.

(56) References Cited

U.S. PATENT DOCUMENTS

| | | | | |
|---|---|---|---|---|
| 3,544,805 | A * | 12/1970 | De Maria | 372/28 |
| 3,747,019 | A * | 7/1973 | Koechner et al. | 372/30 |
| 4,019,159 | A * | 4/1977 | Hon et al. | 359/278 |
| 4,337,442 | A * | 6/1982 | Mauck | 372/13 |
| 4,412,330 | A * | 10/1983 | Mauck et al. | 372/30 |
| 4,483,005 | A * | 11/1984 | Smart | 372/25 |
| 4,630,275 | A * | 12/1986 | Rapoport | 372/13 |
| 4,675,872 | A * | 6/1987 | Popek et al. | 372/10 |
| 5,016,251 | A * | 5/1991 | D'Arcy | 372/10 |
| 5,197,074 | A * | 3/1993 | Emmons et al. | 372/26 |
| 5,400,350 | A | 3/1995 | Galvanauskas | |
| 5,491,707 | A * | 2/1996 | Rieger et al. | 372/25 |
| 5,757,831 | A | 5/1998 | Kmetec et al. | |
| 6,339,604 | B1 * | 1/2002 | Smart | 372/26 |
| 6,414,980 | B1 * | 7/2002 | Wang et al. | 372/92 |
| 6,529,540 | B1 * | 3/2003 | Demmer et al. | 372/92 |
| 6,683,893 | B2 * | 1/2004 | Wang | 372/10 |

(Continued)

*Primary Examiner* — Ari M Diacou

(74) *Attorney, Agent, or Firm* — Spano Law Group; Joseph S. Spano

(57) ABSTRACT

A pulsed laser system includes a variable attenuator located in a secondary optical path bounded by a target surface and one or more reflective surfaces outside of the primary laser oscillator of the laser system. The variable attenuator isolates an output optical amplifier of the laser system from light reflected from the target during time periods between laser pulses. In some embodiments, the variable attenuator is synchronously controlled with the primary laser oscillator. In some other embodiments, the variable attenuator is controlled separately from the primary laser oscillator to shape the generated laser pulses.

20 Claims, 5 Drawing Sheets

(56) References Cited

U.S. PATENT DOCUMENTS

| | | | |
|---|---|---|---|
| 6,782,012 B2 * | 8/2004 | Karasaki et al. | 372/10 |
| 6,826,204 B2 * | 11/2004 | Kennedy et al. | 372/10 |
| 6,831,936 B1 * | 12/2004 | Smart | 372/26 |
| 6,931,035 B2 * | 8/2005 | Wang | 372/10 |
| 6,973,104 B2 * | 12/2005 | Smart | 372/13 |
| 7,019,891 B2 * | 3/2006 | Johnson | 359/311 |
| 7,027,199 B2 * | 4/2006 | Johnson | 359/285 |
| 7,039,079 B2 * | 5/2006 | Seguin et al. | 372/27 |
| 7,058,093 B2 * | 6/2006 | Kennedy et al. | 372/10 |
| 7,133,186 B2 * | 11/2006 | Johnson | 359/311 |
| 7,133,187 B2 * | 11/2006 | Johnson | 359/311 |
| 7,133,188 B2 * | 11/2006 | Johnson | 359/311 |
| 7,212,331 B2 * | 5/2007 | Kawanishi et al. | 359/321 |
| 7,254,147 B2 * | 8/2007 | Ukita et al. | 372/25 |
| 7,428,253 B2 * | 9/2008 | Murison et al. | 372/26 |
| 7,443,893 B2 * | 10/2008 | Murison et al. | 372/26 |
| 7,463,658 B2 * | 12/2008 | Hollemann et al. | 372/21 |
| 7,471,704 B2 * | 12/2008 | Ukita et al. | 372/10 |
| 7,599,407 B2 * | 10/2009 | Ukita et al. | 372/10 |
| 7,724,787 B2 * | 5/2010 | Murison et al. | 372/20 |
| 7,742,511 B2 * | 6/2010 | Murison et al. | 372/26 |
| 7,796,655 B2 * | 9/2010 | Murison et al. | 372/6 |
| 7,817,682 B2 * | 10/2010 | Murison et al. | 372/6 |
| 7,970,026 B2 * | 6/2011 | Grishin et al. | 372/25 |
| 7,974,319 B2 * | 7/2011 | Deladurantaye et al. | 372/6 |
| 8,073,027 B2 * | 12/2011 | Deladurantaye et al. | 372/29.014 |
| 8,265,106 B2 * | 9/2012 | Murison et al. | 372/6 |
| 8,411,716 B2 * | 4/2013 | Jacob et al. | 372/38.02 |
| 8,634,441 B2 * | 1/2014 | Onose et al. | 372/25 |
| 2004/0101002 A1 * | 5/2004 | Ukita et al. | 372/32 |
| 2004/0202207 A1 * | 10/2004 | Wang | 372/10 |
| 2005/0069007 A1 * | 3/2005 | Kennedy et al. | 372/55 |
| 2005/0105568 A1 * | 5/2005 | Smart | 372/25 |
| 2005/0271095 A1 * | 12/2005 | Smart | 372/26 |
| 2006/0227411 A1 * | 10/2006 | Kawanishi et al. | 359/322 |
| 2007/0153842 A1 * | 7/2007 | Ukita et al. | 372/10 |
| 2007/0153843 A1 * | 7/2007 | Ukita et al. | 372/10 |
| 2007/0268942 A1 * | 11/2007 | Murison et al. | 372/25 |
| 2008/0080570 A1 * | 4/2008 | Murison et al. | 372/20 |
| 2009/0067455 A1 * | 3/2009 | Murison et al. | 372/20 |
| 2011/0170564 A1 * | 7/2011 | Desbiens et al. | 372/6 |
| 2011/0243159 A1 * | 10/2011 | Murison et al. | 372/20 |

* cited by examiner

SUPPRESSION OF PARASITIC OPTICAL FEEDBACK IN PULSE LASER SYSTEMS

CROSS REFERENCE TO RELATED APPLICATION

The present application for patent claims priority under 35 U.S.C. §119 from U.S. provisional patent application Ser. No. 61/611,701, entitled "Apparatus and Method for Suppression of Parasitic Optical Feedback in High Repetition Rate Nanosecond-Pulse Lasers," filed Mar. 16, 2012, the subject matter of which is incorporated herein by reference.

TECHNICAL FIELD

The described embodiments relate to optical metrology and inspection systems for microscopy, and more particularly to optical metrology and inspection systems involving high repetition rate pulse laser sources.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

High repetition rate diode-pumped solid-state (DPSS) lasers are widely utilized to perform various material processing tasks such as surface cleaning, surface polishing, cutting, and drilling, among others. These applications involve the interaction of high-intensity pulsed laser light generated by the laser with a material surface. Surface reflectivity provides a mechanism for a portion of the light delivered to the material surface to reflect back to the laser system. Optical feedback between the target (e.g., material surface) and the laser during the laser pulse is well investigated. Various methods for suppressing optical feedback during the laser pulse are implemented in modern laser systems.

In one example, Faraday isolators are employed to selectively block reflected light. However, Faraday isolators are only applicable to polarized laser light. The polarization properties of the reflected light may differ significantly from that of the incident light. In addition, even for polarized laser beams, the effectiveness of employing Faraday isolators to attenuate laser light reflected from a target is limited. Faraday isolators are undesirable in high power lasers because of their relatively low transmission efficiency (e.g., less than 90%) and low damage threshold.

In another example, the surface normal of the target may be oriented at an angle with respect to the incident laser beam to prevent reflected light from reentering the laser system. However, this is not an option for applications that require normal incidence of the laser beam onto the processing surface.

As high power, pulsed laser systems are developed, parasitic optical feedback becomes a limiting factor in system operation. Thus, improved methods and systems for attenuating light reflected from target surfaces to the laser system are desired.

SUMMARY

A pulsed laser system includes a variable attenuator located in a secondary optical path bounded by a target surface and one or more reflective surfaces outside of the primary laser oscillator of the laser system. The variable attenuator isolates an output optical amplifier of the laser system from light reflected from the target during time periods between laser pulses.

In one embodiment, the variable attenuator is located between an output optical amplifier and an exit window of the laser system. In another embodiment, the variable attenuator is located between an output optical amplifier and an output coupler of the primary laser oscillator. In a preferred embodiment, the variable attenuator is an acousto-optical modulator (AOM). In other embodiments, one or more Pockels cells are employed as the variable attenuator.

During generation of a laser pulse, the variable attenuator is switched to a low attenuation state (i.e., high transmission efficiency) that allows light to pass through with minimal losses. However, to prevent parasitic optical feedback during a time period between laser pulses, optical transmission through the output amplifier must be effectively attenuated to prevent amplification of light reflected by the target surface. The variable attenuator effectively isolates the output amplifier from light reflected from the target by switching to a high attenuation state (i.e., low transmission efficiency) during time periods between laser pulses.

In some embodiments, the variable attenuator is synchronously controlled with the primary laser oscillator. In some other embodiments, the variable attenuator is controlled separately from the primary laser oscillator to shape the generated laser pulses.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
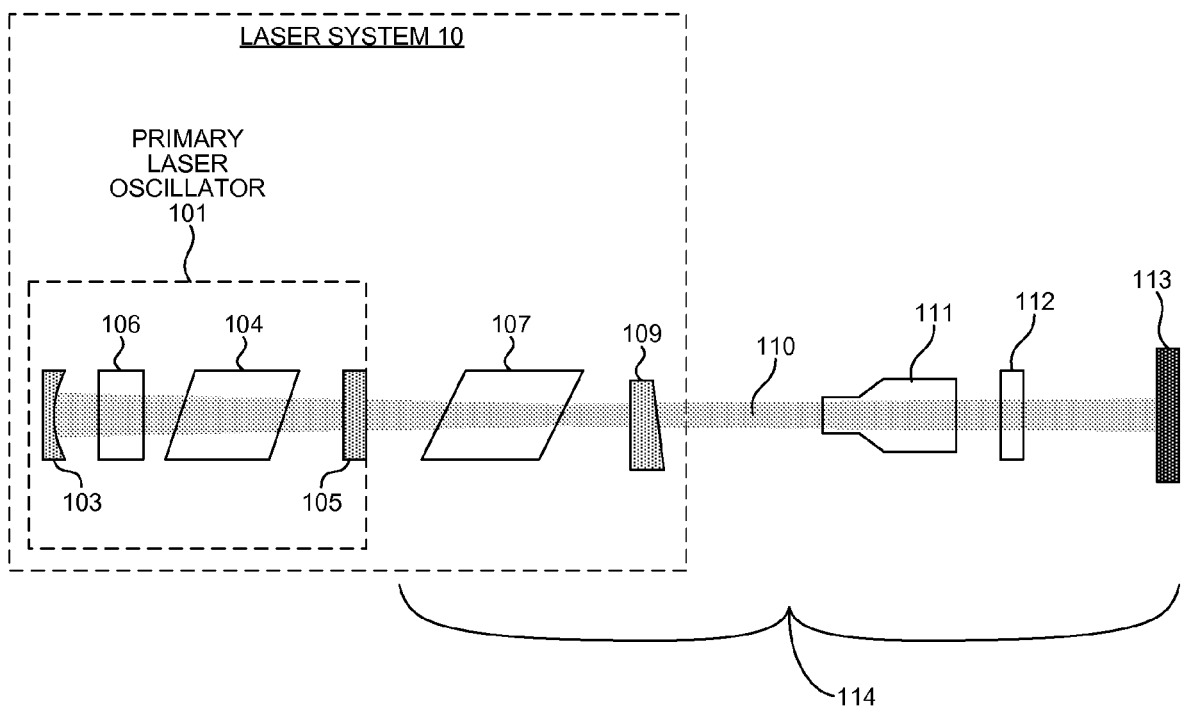
FIG. 1 illustrates a typical application scheme employing a high power, pulsed laser system 10.

FIG. 1 illustrates a typical application scheme employing a high power, pulsed laser system 10. Pulsed laser system 10 includes a primary laser oscillator 101 that seeds an output optical amplifier 107. Output optical amplifier 107 is external to the primary laser oscillator 101 and provides the final amplification of the pulsed laser light before the amplified, pulsed laser light exits the laser system 10 through exit window 109. As illustrated in FIG. 1, by way of example, pulsed laser beam 110 is expanded by expander 111 and then focused onto the target 113 by objective 112. In one non-limiting example, laser system 10 is a model number AO16E laser system manufactured by POWERLASE Photonics LTD., Crawley, UK. The pulsed laser beam 110 is expanded by a factor of five and focused with an objective having a numerical aperture of 0.13 resulting in a focal spot size of approximately 100 micrometers.

The inventors have observed a continuous wavelength leakage effect in the aforementioned application scheme. This effect is noticeable for a surface normal oriented within six degrees of the incident focused beam. In addition, this effect is noticeable even for targets having a surface reflectivity of less than one percent.

For high average power (e.g., greater than one hundred Watts), pulsed lasers operating at high repetition rates (e.g., greater than one kilohertz) target surfaces with even moderate reflectivity (e.g., greater than 0.5%) cause the generation of laser light output between pulses (i.e., a continuous wavelength leakage effect). The inventors have observed light output between pulses reaching an intensity value up to a few percent of the main pulse intensity. For many applications, this leakage is a critical obstacle to operation, especially when operating at power levels greater than one hundred Watts.

The inventors have discovered that the continuous wavelength leakage effect is caused by the formation of an unintended, secondary, external cavity 114 between the target surface 113 and a reflective element in the laser system 10 (e.g., output optical coupler 105). The external cavity 114 includes output optical amplifier 107 which acts as the gain medium for the secondary, external cavity 114. The secondary, external cavity 114 lacks an optical switch, and thus initiates the observed continuous wavelength leakage effect.

In some applications, the leakage intensity reaches the surface damage threshold and the reflectivity of the target surface drops dramatically. This suppresses the optical feedback mechanism and reduces the continuous wavelength leakage effect. However, in applications where the surface damage threshold in not reached (e.g., non-destructive applications, moving target applications, etc.) the continuous wavelength leakage effect cannot be suppressed by surface damage. As a result, the target is exposed to high intensity light not only during the pulse period, but also during the time period between pulses. For example, for a moving target application, the target is exposed to high intensity light during the pulse period over a desired area, but is also exposed to high intensity light over areas where exposure is not desirable due to leakage between pulses. In some examples, this could result in continuous surface damage during a target transition between pulses.

In one aspect, a variable attenuator is located in an optical path that includes light reflected from the target toward the output optical amplifier of a high power, pulsed laser system. The variable attenuator isolates the output optical amplifier from light reflected from the target during time periods between laser pulses. In some embodiments, the variable attenuator is synchronously controlled with the primary laser oscillator. In some other embodiments, the variable attenuator is controlled separately from the primary laser oscillator to shape the generated laser pulses.

Figure 2:
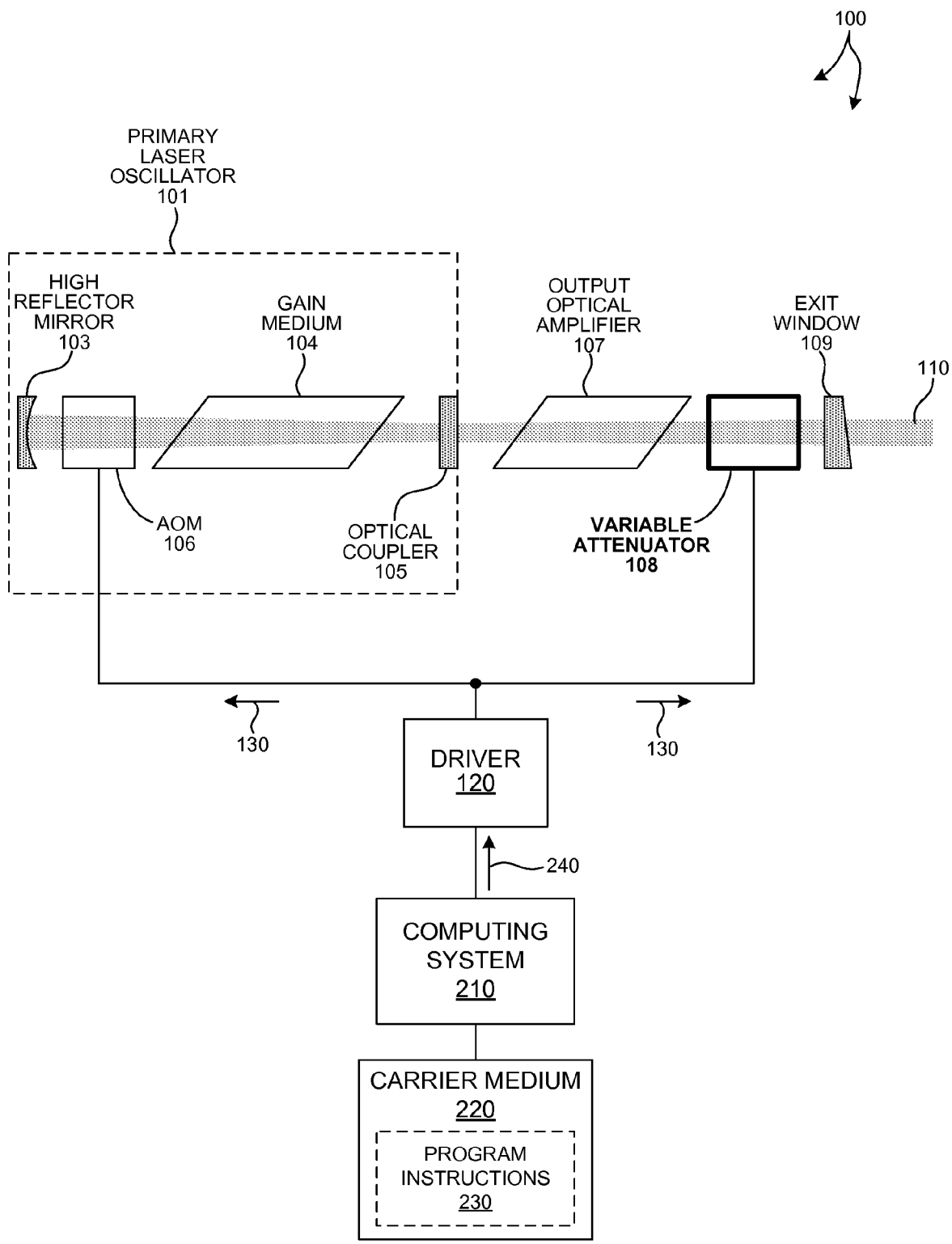
FIG. 2 is illustrative of an embodiment of a laser system 100 including a variable attenuator 108 located between the output optical amplifier 107 and the laser exit window 109.

FIG. 2 is illustrative of an embodiment of a laser system 100 including a variable attenuator 108 located between the output optical amplifier 107 and the laser exit window 109. As illustrated in FIG. 2, primary laser oscillator 101 of laser system 100 includes a Q-switched, resonant optical cavity bounded by a high reflector mirror 103 and optical coupler 105. Atoms of gain medium 104 are excited by an external source of energy (e.g., diode laser) into an excited state. The gain medium 104 absorbs pump energy, which raises some electrons into higher-energy ("excited") quantum states. Stimulated photonic emission by the excited electrons releases photons and generates light that contributes to an amount of light resonating within the resonant optical cavity. When the number of electrons in an excited state exceeds the number of electrons in a lower-energy state, population inversion is achieved. At this point, the amount of stimulated emission is larger than the amount of absorption. Hence, an amount of light resonating within the optical cavity of the primary laser oscillator 101 is amplified. In a Q-switched laser, the population of excited electrons is allowed to build by introducing a loss inside the resonant optical cavity that exceeds the gain of the gain medium 104 using a variable attenuator. This is known as reducing the quality factor or 'Q' of the cavity. When the stored pump energy reaches a desired level, the loss mechanism is rapidly removed (i.e., the quality factor or 'Q' of the cavity is rapidly switched) and the energy stored in the gain medium 104 is quickly transferred to a short pulse of light emitted from primary laser oscillator 101. The rapid transfer of energy results in a short duration pulse of light having a high peak power level. In the depicted embodiment, an acousto-optical modulator (AOM) 106 is a variable attenuator employed as the "Q-switch" that dictates the timing of laser pulses. AOM 106 is presented by way of non-limiting example. Other types of variable attenuators may be contemplated. For example, one or more Pockels cells may be employed as the "Q-switch" of the primary laser oscillator 101.

The laser light pulses emitted from primary laser oscillator 101 pass through output optical amplifier 107 where they are further amplified. Similar to primary laser oscillator 101, output optical amplifier 107 includes a gain medium that is excited by an external source of energy (e.g., diode laser). The gain medium absorbs pump energy and by a process of stimulated photonic emission the stored energy is released as photons into the beam of light passing through amplifier 107. In this manner, the amount of light from primary laser oscillator 101 passing through output optical amplifier 107 is amplified to produce amplified, pulsed laser light. As illustrated in FIG. 2, the amplified pulsed laser light passes through variable attenuator 108 and exits laser system 100 through exit window 109.

In a preferred embodiment, variable attenuator 108 is an acousto-optical modulator (AOM). An AOM is a suitable variable attenuator because of its high speed switching capability and insensitivity to the polarization properties of the laser light. During generation of a pulse, AOM 108 is switched to a low attenuation state (i.e., high transmission efficiency) that allows light to pass through with minimal losses. However, optical transmission through external cavity 114 (illustrated in FIG. 1) must be effectively attenuated for a substantial fraction of the period of time between laser pulses to prevent amplification of light reflected by the target surface. AOM 108 effectively isolates the output optical amplifier from light reflected from the target during time periods between laser pulses by switching to a high attenuation state (i.e., low transmission efficiency) for a period of time between laser pulses. Although, an AOM is provided by way of example, any other variable attenuator suitable to attenuate parasitic light between laser pulses may be contemplated. For example, one or more Pockels cells may be employed as the variable attenuator 108 suitable to attenuate parasitic light between laser pulses. In one example, non-polarized pulsed laser light may be polarized to generate pulsed laser light polarized in two orthogonal dimensions. Two Pockels cells may be disposed in the light path to attenuate each orthogonally polarized portion of the polarized, pulsed laser light, respectively. The resulting orthogonally polarized, pulsed laser light may be recombined before exiting laser system 100. Such an embodiment may be suitable in applications where the losses associated with polarization of the pulsed laser light are acceptable.

In the embodiment depicted in FIG. 2, both AOM 108 and AOM 106 of the primary laser oscillator 101 are synchronously controlled by driver 120. Driver 120 generates a control signal 130 that is communicated to AOM 108 and AOM 106. In one embodiment, driver 120 is a radio frequency driver suitable to control the state transitions of an AOM such as AOM 106 and AOM 108. Control signal 130 determines the timing of transitions between states of AOM 108 and AOM 106. For example, in a first phase, control signal 130 is in a first state. In response, AOM 108 and AOM 106 are in a high attenuation (i.e., low transmission efficiency or low quality) state. For the duration of the first phase, a buildup of the population in the gain media of the primary laser oscillator 101 and the amplifier output optical amplifier 107 occurs. In this phase, AOM 108 prevents spontaneously emitted light from reaching the target and prevents light reflected from a target from reaching the output coupler 105 of the primary laser oscillator 101. The low transmission efficiency of AOM 108 during this phase effectively dumps buildup of any amplified spontaneous emission (ASE) and effectively eliminates continuous wavelength leakage. When the population reaches an optimal value, control signal 130 changes from the first state to a second state. In response, AOM 108 and AOM 106 switch to a low attenuation (i.e., high transmission efficiency or high quality) state. In this second phase, a high power laser pulse is generated and emitted from laser system 100. After emission of the laser pulse, control signal 130 changes back to the first state. In response, AOM 108 and AOM 106 switch back to the high attenuation (i.e., low transmission efficiency or low quality) state. This sequence repeats at a predefined repetition rate.

The embodiment of laser system 100 depicted in FIG. 2 also includes one or more computing systems 210 employed to generate a command signal 240 communicated to driver 120. In response to the command signal 240, driver 120 generates control signal 130. In this manner, the timing of pulse generation by laser system 100 is determined by computing system 210.

It should be recognized that the various steps described throughout the present disclosure may be carried out by a single computer system 210 or, alternatively, a multiple computer system 210. Moreover, different subsystems of a laser system employing a variable attenuator to isolate an output optical amplifier from light reflected from the target during time periods between laser pulses may include a computer system suitable for carrying out at least a portion of the steps described herein. Therefore, the description presented herein should not be interpreted as a limitation on the present invention but merely an illustration. Further, the one or more computing systems 210 may be configured to perform any other step(s) of any of the method examples described herein.

The computer system 210 may be configured to receive and/or acquire data or information from another system by a transmission medium that may include wireline and/or wireless portions. In this manner, the transmission medium may serve as a data link between the computer system 210 and other subsystems. Further, the computing system 210 may be configured to receive parameters or instructions via a storage medium (i.e., memory). Moreover, the computer system 210 may send data to external systems via a transmission medium. The transmission medium may include wireline and/or wireless portions. In this manner, the transmission medium may serve as a data link between the computer system 210 and other subsystems or external systems. For example, computer system 210 may send command signals generated by computer system 210 to external systems or to other subsystems via a transmission medium.

The computing system 210 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 230 implementing methods such as those described herein may be transmitted over or stored on carrier medium 220. The carrier medium may be a transmission medium such as a wire, cable, or wireless transmission link. The carrier medium may also include a computer-readable medium such as a read-only memory, a random access memory, a magnetic or optical disk, or a magnetic tape.

Figure 3:
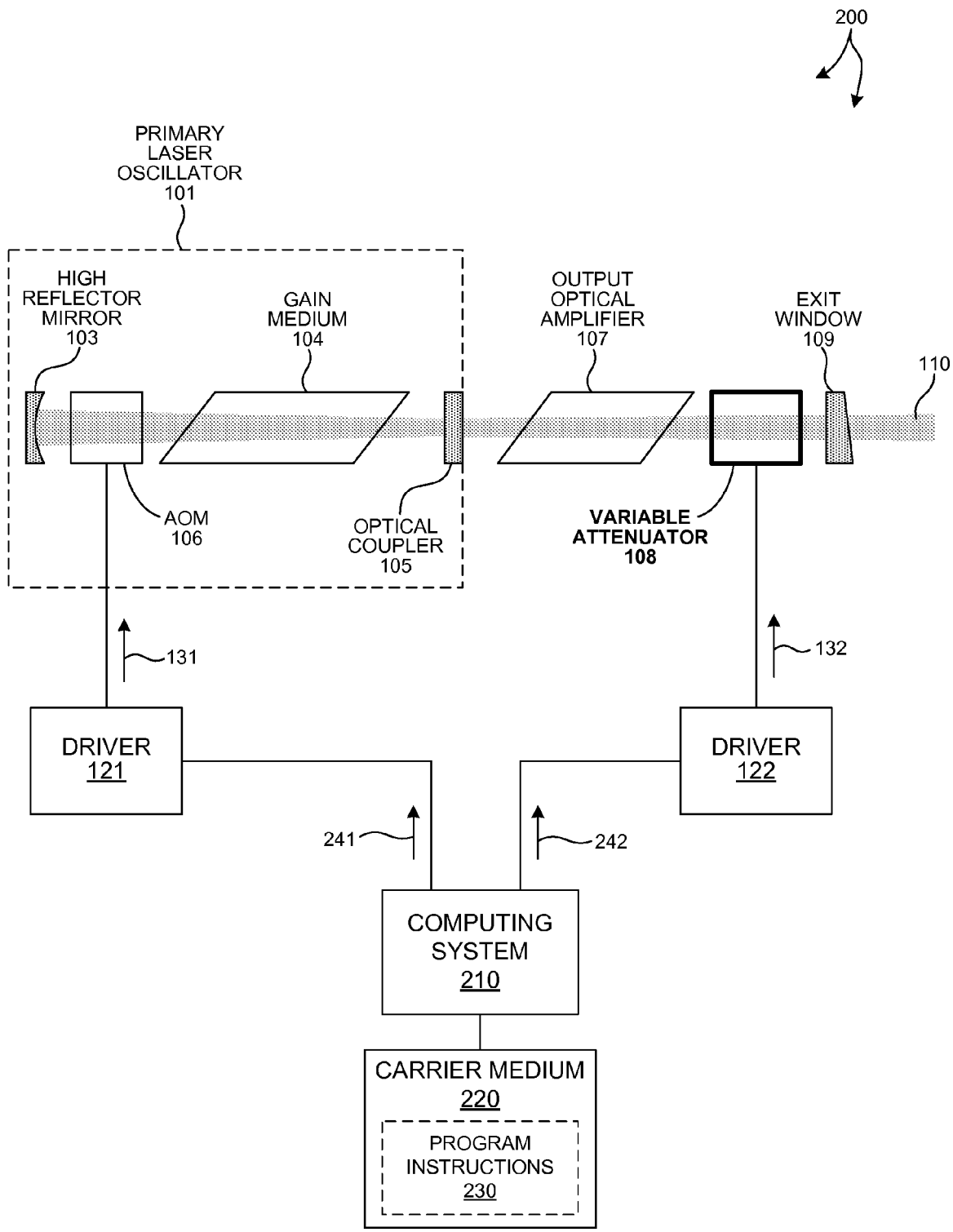
FIG. 3 illustrates laser system 200 in another embodiment of the present invention.

FIG. 3 illustrates laser system 200 in another embodiment of the present invention. As illustrated in FIG. 3, laser system 200 includes similar, like numbered elements described with reference to FIG. 2. However, laser system 200 includes a driver 121 to control AOM 106 and a separate driver 122 to control AOM 108. In this manner, the timing of state transitions of AOM 108 and AOM 106 may be individually tuned to accommodate corrections due to light propagation time delays.

As depicted in FIG. 3, driver 121 generates a control signal 131 that is communicated to AOM 106. Control signal 131 determines the timing of state transitions of AOM 106. In addition driver 122 generates a control signal 132 that is communicated to AOM 108. Similarly, control signal 132 determines the timing of state transitions of AOM 108. In the depicted embodiment, laser system 200 also includes one or more computing systems 210 employed to generate a command signal 241 communicated to driver 121. In response to the command signal 241, driver 121 generates control signal 131. Similarly, one or more computing systems 210 generates a command signal 242 communicated to driver 122. In response to the command signal 242, driver 122 generates control signal 132. In this manner, the timing of pulse generation by primary laser oscillator 101 may be determined independently from the timing of pulse amplification by output optical amplifier 107 by computing system 210.

In the aforementioned descriptions of FIGS. 2 and 3, one or more radio frequency drivers are employed to control AOM 106 and AOM 108. However, in general, any type of driver suitable to control each variable attenuator may be contemplated. For example, in some embodiments, one or more Pockels cells may be employed as any of variable attenuators 106 and 108. In these embodiments, driver 120, or alternatively, any of drivers 121 and 122 may be high voltage drivers suitable to control the state transitions of the one or more Pockels cells.

Figure 4:
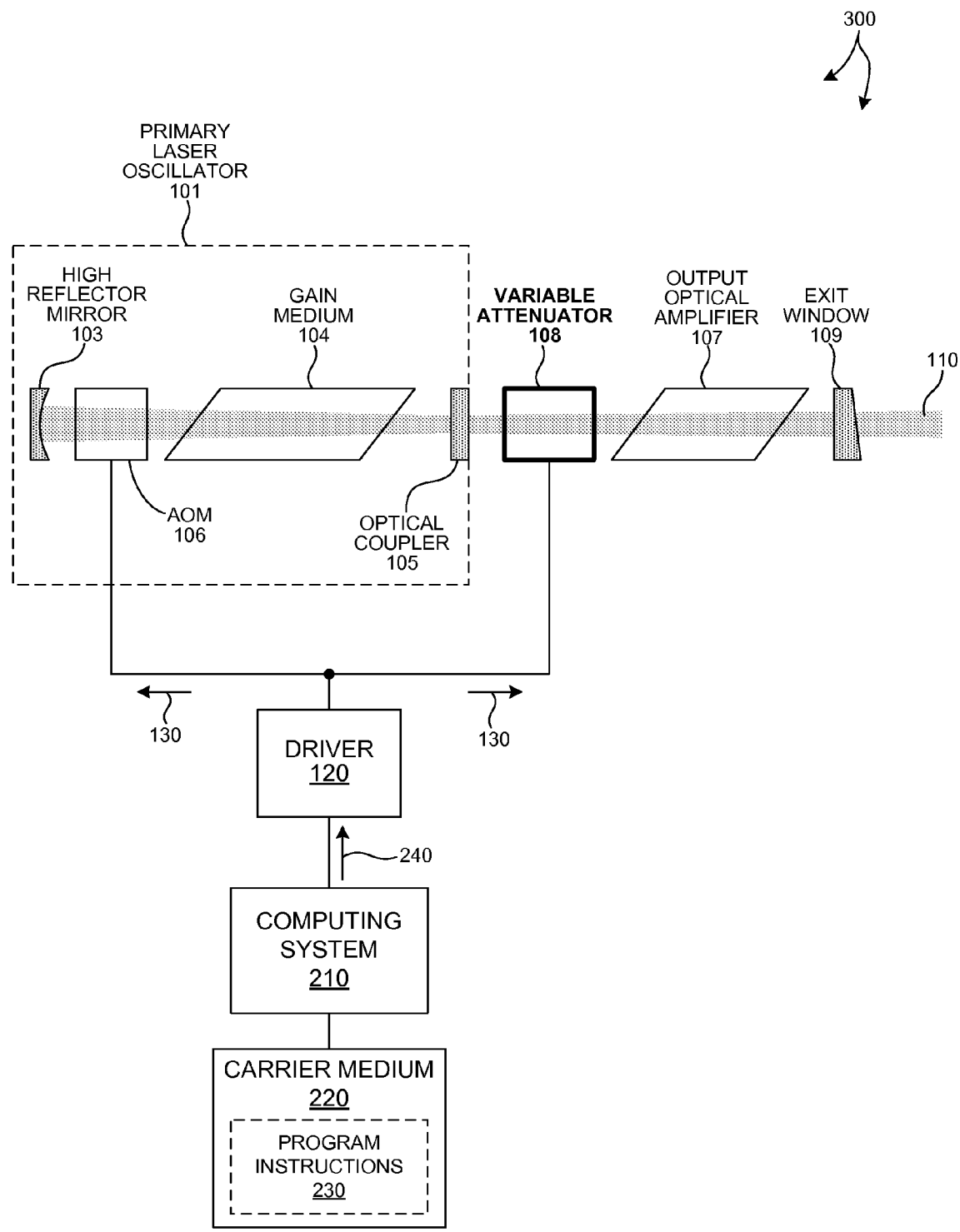
FIG. 4 illustrates laser system 300 in yet another embodiment of the present invention.

FIG. 4 illustrates laser system 300 in another embodiment of the present invention. As illustrated in FIG. 4, laser system 300 includes similar, like numbered elements described with reference to FIG. 2. However, variable attenuator 108 of laser system 200 is located between output optical amplifier 107 and output coupler 105 of the primary laser oscillator 101.

The locations of variable attenuator 108 in the embodiments depicted in FIGS. 2-4 are provided by way of non-limiting example. In general, one or more variable attenuators may be located anywhere in the optical path of the secondary resonant cavity. The main mechanism for light generation between laser pulses is the formation of a secondary resonant cavity outside the primary laser oscillator. The secondary resonant cavity is bounded by the target surface and one or more reflective surfaces of the laser system and includes the output optical amplifier. Hence, one or more variable attenuators may be located anywhere in the resonant optical path of the secondary resonant cavity.

Figure 5:
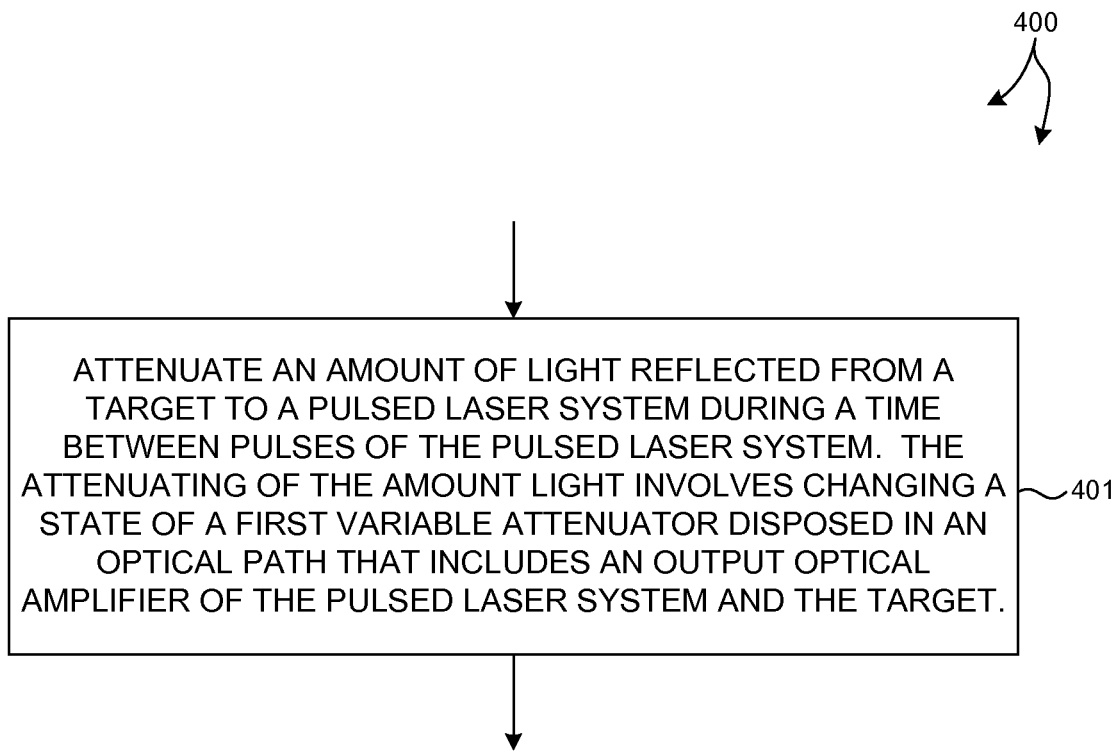
FIG. 5 is a flowchart illustrative of one exemplary method 400 for attenuating an amount of light reflected from a target to a pulsed laser system during a time between laser pulses.

FIG. 5 illustrates a method 400 suitable for implementation by any of the laser systems of the present invention. In one aspect, it is recognized that data processing blocks of method 400 may be carried out via a pre-programmed algorithm stored as part of program instructions 230 and executed by one or more processors of computing system 210. While the following description is presented in the context of the laser systems depicted in FIGS. 2-4, it is recognized herein that the particular structural aspects of laser systems 100, 200, and 300 do not represent limitations and should be interpreted as illustrative only.

In block 401, variable attenuator 108 attenuates an amount of light reflected from a target to a pulsed laser system during a time between pulses of the pulsed laser system. The attenuating of the amount light involves changing a state of a first variable attenuator 108. The variable attenuator 108 is disposed in an optical path that includes an output optical amplifier 107 of the pulsed laser system and a target surface 113.

In one or more exemplary embodiments, the functions described may be implemented in hardware, software, firmware, or any combination thereof. If implemented in software, the functions may be stored on or transmitted over as one of more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer readable media can comprise RAM, ROM, EEPROM, CD-ROM of other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A laser system comprising:
a primary laser oscillator having a first optical cavity, a first variable attenuator, and an output coupler, the primary laser oscillator operable to generate an amount of pulsed laser light emitted from the output coupler;
an output optical amplifier operable to receive the amount of pulsed laser light generated by the primary laser oscillator and generate an amount of amplified pulsed laser light emitted from an exit window of the laser system;
a second variable attenuator disposed in an optical path of the laser system between the output coupler and the exit window, wherein the second variable attenuator is operable to isolate the laser system from an amount of light reflected from a target during a time between laser pulses of the amplified pulsed laser light.

2. The laser system of claim 1, further comprising:
a driver coupled to the first variable attenuator and the second variable attenuator, wherein the driver generates a synchronous control signal communicated to both the first and second variable attenuators such that the first and second variable attenuators change state to allow a pulse of amplified laser light to exit the exit window.

3. The laser system of claim 2, further comprising:
a controller configured to generate a command signal communicated to the driver, wherein the driver generates the synchronous control signal based at least in part on the command signal.

4. The laser system of claim 1, further comprising:
a first driver, wherein the first driver generates a first control signal that is communicated to the first variable attenuator; and
a second driver, wherein the second radio driver generates a second control signal that is communicated to the second variable attenuator such that the first variable attenuator changes state at a different time than the second variable attenuator to allow a pulse of amplified laser light to exit the exit window.

5. The laser system of claim 4, further comprising:
a controller configured to generate a first command signal and a second command signal, the first command signal communicated to the first driver, wherein the first driver generates the first control signal based at least in part on the first command signal, and the second command signal communicated to the second driver, wherein the second driver generates the second control signal signal based at least in part on the second command signal.

6. The laser system of claim 1, wherein the first and second variable attenuators are acousto-optical modulators.

7. The laser system of claim 1, wherein a repetition rate of the pulsed laser light is at least one kilohertz.

8. The laser system of claim 1, wherein a duration of the pulsed laser light is greater than one nanosecond.

9. The laser system of claim 1, wherein an output power of the laser system is greater than one hundred Watts.

10. A method of suppressing parasitic optical feedback in a pulsed laser system, comprising;
attenuating an amount of light reflected from a target to the pulsed laser system during a time between pulses of the pulsed laser system, wherein the target is disposed outside the pulsed laser system and the attenuating of the amount light involves changing a state of a first variable attenuator disposed in an optical path that includes an output optical amplifier of the pulsed laser system and the target.

11. The method of claim 10, wherein the changing the state of the first variable attenuator involves communicating a first control signal to the first variable attenuator that is sychronized with a second control signal communicated to a second variable attenuator disposed in an optical cavity of a primary laser oscillator of the pulsed laser system.

12. The method of claim 10, wherein the changing the state of the first variable attenuator involves communicating a first control signal to the first variable attenuator that causes the first variable attenuator to change state at a first time, and wherein a second control signal is communicated to a second variable attenuator disposed in an optical cavity of a primary laser oscillator of the pulsed laser system that causes the second variable attenuator to change state at a second time that is different from the first time.

13. The method of claim 10, wherein the first variable attenuator is an acousto-optical modulator.

14. A laser system comprising:
a primary laser oscillator having a first optical cavity, a first variable attenuator, and an output coupler, the primary laser oscillator operable to generate an amount of pulsed laser light emitted from the output coupler;
an output optical amplifier operable to receive the amount of pulsed laser light generated by the primary laser oscillator and generate an amount of amplified, pulsed laser light emitted from an exit window of the laser system;
a second variable attenuator disposed in an optical path of the laser system between the output coupler and the exit window; and
a computer configured to communicate a first command signal to a first driver, wherein the first radio frequency amplifier generates a first control signal based at least in part on the first command signal, and wherein the second variable attenuator changes state in response to the first control signal to isolate the laser system from an amount of light reflected from a target during a time between laser pulses of the amplified, pulsed laser light.

15. The laser system of claim 14, wherein the first driver is also coupled to the first variable attenuator, and wherein the first control signal is communicated to the first variable attenuator such that the first and second variable attenuators operate synchronously.

16. The laser system of claim 14, further comprising:
a second driver, wherein the second driver generates a second control signal that is communicated to the first variable attenuator in response to a second command signal generated by the computer such that the first variable attenuator changes state at a different time than the second variable attenuator.

17. The laser system of claim 14, wherein the first and second variable attenuators are acousto-optical modulators.

18. The laser system of claim 14, wherein a repetition rate of the pulsed laser light is at least one kilohertz.

19. The laser system of claim 14, wherein a duration of the pulsed laser light is greater than one nanosecond.

20. The laser system of claim 14, wherein an output power of the laser system is greater than one hundred Watts.

* * * * *